United States Patent
Zhao et al.

(10) Patent No.: US 9,591,572 B2
(45) Date of Patent: Mar. 7, 2017

(54) APPARATUS, SYSTEM AND METHOD FOR OPTIMIZING POWER CONSERVATION

(71) Applicant: APPLE INC., Cupertino, CA (US)

(72) Inventors: Yingjie Zhao, Pleasanton, CA (US); Li Su, San Jose, CA (US); Sreevalsan Vallath, Dublin, CA (US); Wanping Zhang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 43 days.

(21) Appl. No.: 14/604,246

(22) Filed: Jan. 23, 2015

(65) Prior Publication Data

US 2016/0219518 A1 Jul. 28, 2016

(51) Int. Cl.
*H04W 52/02* (2009.01)
*H04W 72/14* (2009.01)
*H04L 1/00* (2006.01)
*H04W 76/00* (2009.01)
*H04W 72/04* (2009.01)

(52) U.S. Cl.
CPC .......... *H04W 52/0225* (2013.01); *H04L 1/00* (2013.01); *H04W 52/0216* (2013.01); *H04W 52/0229* (2013.01); *H04W 52/0274* (2013.01); *H04W 76/00* (2013.01); *H04W 72/042* (2013.01)

(58) Field of Classification Search
CPC ............ H04W 52/0225; H04W 72/14; H04W 52/0274; H04W 52/0229; H04W 52/0216; H04W 76/00; H04W 72/042; H04L 1/00
See application file for complete search history.

(56) References Cited

U.S. PATENT DOCUMENTS

| | | | | |
|---|---|---|---|---|
| 2013/0003672 A1* | 1/2013 | Dinan | ...................... | H04L 1/00 370/329 |
| 2013/0003673 A1* | 1/2013 | Dinan | ............... | H04W 72/0406 370/329 |
| 2014/0301272 A1* | 10/2014 | Vajapeyam | .......... | H04B 1/0475 370/328 |
| 2014/0335863 A1* | 11/2014 | Wu | ..................... | H04W 76/048 455/436 |
| 2015/0163741 A1* | 6/2015 | Sheth | ................ | H04W 52/0222 370/311 |
| 2015/0172032 A1* | 6/2015 | Khay-Ibbat | ........... | H04L 5/0057 370/329 |

(Continued)

*Primary Examiner* — Brian D Nguyen
(74) *Attorney, Agent, or Firm* — Fay Kaplun & Marcin, LLP

(57) ABSTRACT

A user equipment (UE) and corresponding methods to conserve power by the UE. The UE includes a transceiver, the transceiver configured to enable the UE to establish a connection with a Long Term Evolution (LTE) network and configured to operate using a Connected Discontinuous Reception (CDRX) functionality. The processor controls the transceiver by receiving an uplink (UL) grant at a first subframe of a frame of a cycle of the CDRX functionality, transmitting data based upon the UL grant at a predetermined second subframe, and receiving a response from the LTE network corresponding to one of an acknowledgement (ACK) and a negative ACK (NACK) at a predetermined third subframe. The processor deactivates the transmitter for a remainder of the frame based or deactivates a receiver for a remainder of the frame based upon whether the ACK is received.

20 Claims, 5 Drawing Sheets

(56) References Cited

U.S. PATENT DOCUMENTS

| | | | |
|---|---|---|---|
| 2015/0189627 A1* | 7/2015 | Yang | H04L 5/0098 370/280 |
| 2015/0195072 A1* | 7/2015 | Seo | H04L 1/1614 370/329 |
| 2015/0257150 A1* | 9/2015 | Yi | H04B 7/26 370/329 |

* cited by examiner

APPARATUS, SYSTEM AND METHOD FOR OPTIMIZING POWER CONSERVATION

BACKGROUND INFORMATION

A user equipment (UE) may be configured to establish a connection with a network. For example, the UE may be mobile and utilize a wireless communications protocol. Based upon the capabilities of the hardware and software of the UE, the connection may be made with different types of networks. For example, the network may be a Long Term Evolution (LTE) network. When connected to the LTE network, various functionalities may become available corresponding to capabilities of the LTE network and the UE. For example, the UE may utilize Discontinuous Reception (DRX), particularly Connected DRX (CDRX). The DRX and CDRX may be features of the LTE network that enables the UE to conserve a limited power supply.

The UE may also be configured to communicate with the LTE network and/or with other UEs via the LTE network. This communication may include the UE receiving data (i.e., downlink) or transmitting data (i.e., uplink). For example, the user of the UE may wish to write an email and transmit this data. In another example, the UE may provide network parameter information to a network component of the LTE such as an evolved Node B (eNB). To properly transmit data from the UE, the communication parameters between the UE and the LTE network are required to be synchronized. One mechanism used in this regard is the grant of uplink resources by the LTE network for the UE. Based upon scheduling involving frames and subframes, the UE may transmit data based upon the uplink grant. One particular type of information that may be transmitted is a channel quality indicator (CQI) such as during a Voice over LTE (VoLTE) call.

Although the CQI information may provide an improved experience for the user, the manner in which the CQI and other uplink transmissions operate relative to the CDRX cycle may conflict with an optimization of power conservation. For example, the CQI information may be transmitted in a cyclical manner that may repeatedly force the transmitter of the UE into a wake state from a sleep state. In another example, for each transmission, the UE may await a response from the LTE network. The response may unnecessarily force the receiver of the UE into a wake state from a sleep state, particularly when the response may have little to no impact on any communication performance.

SUMMARY

In a first exemplary embodiment, a user equipment includes a transceiver including a transmitter and a receiver, the transceiver configured to enable the user equipment to establish a connection with a Long Term Evolution (LTE) network, the user equipment and the LTE network configured with and utilizing a Connected Discontinuous Reception (CDRX) functionality and a processor configured to control an operation of the transceiver. The processor controls the transceiver by receiving an uplink grant from the LTE network at a first subframe of a frame of a cycle of the CDRX functionality, transmitting data based upon the uplink grant at a predetermined second subframe subsequent to the first subframe in the frame, receiving a response from the LTE network corresponding to one of an acknowledgement (ACK) and a negative ACK (NACK) at a predetermined third subframe subsequent to the second subframe in the frame and deactivating the transmitter for a remainder of the frame based upon an error value associated with the user equipment during a duration while connected to the LTE network prior to when the ACK is received.

In another exemplary embodiment, a UE performs a method to control an operation of a transceiver including a transmitter and a receiver, the transceiver configured to enable the user equipment to establish a connection with a Long Term Evolution (LTE) network, the user equipment and the LTE network configured with and utilizing a Connected Discontinuous Reception (CDRX) functionality. The method includes receiving an uplink grant from the LTE network at a first subframe of a frame of a cycle of the CDRX functionality, transmitting data based upon the uplink grant at a predetermined second subframe subsequent to the first subframe in the frame, receiving a response from the LTE network corresponding to one of an acknowledgement (ACK) and a negative ACK (NACK) at a predetermined third subframe subsequent to the second subframe in the frame and deactivating a transmitter for a remainder of the frame based upon an error value associated with the user equipment during a duration while connected to the LTE network prior to when the ACK is received.

In a further exemplary embodiment, a user equipment includes a transceiver including a transmitter and a receiver, the transceiver configured to enable the user equipment to establish a connection with a Long Term Evolution (LTE) network, the user equipment and the LTE network configured with and utilizing a Connected Discontinuous Reception (CDRX) functionality and a processor configured to control an operation of the transceiver. The processor controls the transceiver by by receiving an uplink grant from the LTE network at a first subframe of a frame of a cycle of the CDRX functionality, transmitting data based upon the uplink grant at a predetermined second subframe subsequent to the first subframe in the frame, receiving a response from the LTE network corresponding to one of an acknowledgement (ACK) and a negative ACK (NACK) at a predetermined third subframe subsequent to the second subframe in the frame and deactivating the receiver for a remainder of the frame based upon whether the ACK is received in response to transmitting the data.

In another exemplary embodiment, a UE performs a method to control an operation of a transceiver including a transmitter and a receiver, the transceiver configured to enable the user equipment to establish a connection with a Long Term Evolution (LTE) network, the user equipment and the LTE network configured with and utilizing a Connected Discontinuous Reception (CDRX) functionality, the user equipment configured to perform a Voice over LTE (VoLTE) call. The method includes receiving an uplink grant from the LTE network at a first subframe of a frame of a cycle of the CDRX functionality, transmitting data based upon the uplink grant at a predetermined second subframe subsequent to the first subframe in the frame, receiving a response from the LTE network corresponding to one of an acknowledgement (ACK) and a negative ACK (NACK) at a predetermined third subframe subsequent to the second subframe in the frame and deactivating a receiver for a remainder of the frame based upon whether the ACK is received in response to transmitting the data.

DETAILED DESCRIPTION

Figure 1:
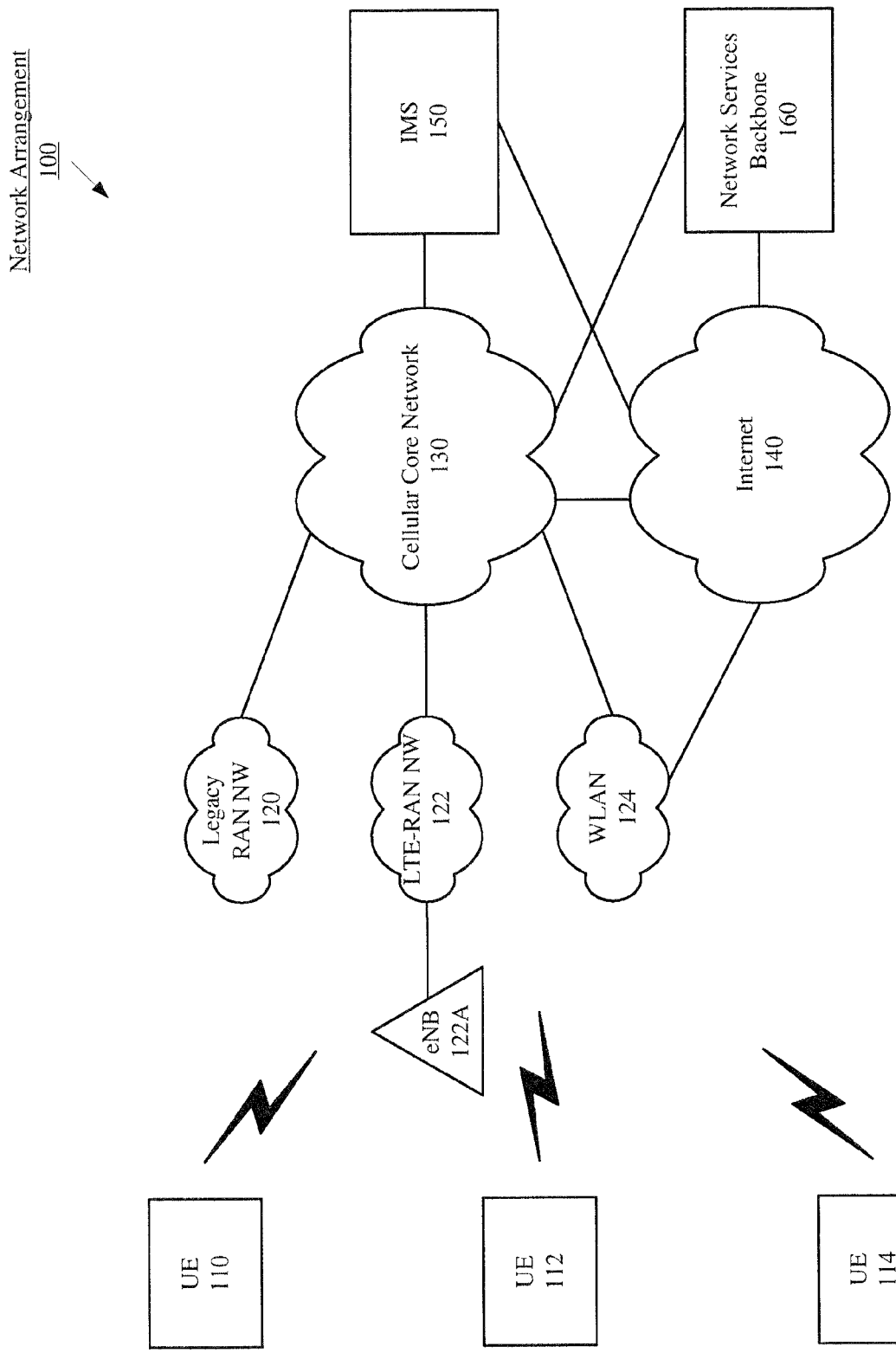
FIG. 1 shows an exemplary network arrangement.

The exemplary embodiments may be further understood with reference to the following description and the related appended drawings, wherein like elements are provided with the same reference numerals. The exemplary embodiments are related to a system and method for optimizing power conservation. Specifically, when a user equipment (UE) is connected to a Long Term Evolution (LTE) network and also configured with a Connected Discontinuous Reception (CDRX) functionality, the exemplary embodiments may deactivate a transmitter and/or a receiver of the UE to conserve additional power.

FIG. 1 shows an exemplary network arrangement 100. The exemplary network arrangement 100 includes UEs 110-114. Those skilled in the art will understand that the UEs 110-114 may be any type of electronic component that is configured to communicate via a network, e.g., mobile phones, tablet computers, desktop computers, smartphones, phablets, embedded devices, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes.

Each of the UEs 110-114 may be configured to communicate directly with one or more networks. In this example, the networks with which the UEs 110-114 may communicate are a legacy radio access network (RAN) 120, a LTE RAN (LTE-RAN) 122, and a wireless local area network (WLAN) 124. In this example, each of the networks 120-124 is a wireless network with which the UEs 110-114 may communicate wirelessly. However, it should be understood that the UEs 110-114 may also communicate with other types of networks and may also communicate using a wired connection. With regards to the exemplary embodiments, the UEs 110-114 may establish a connection with the LTE-RAN 122 to, among other functionalities, perform Voice over LTE (VoLTE) calls with other UEs. For example, the UEs 110-114 may have a LTE chipset and communicate with the LTE-RAN 122. Again, the use of three (3) networks is only exemplary and there may be any other number of networks with which the UEs 110-114 may communicate.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, etc.) that are configured to send and receive traffic from UEs that are equipped with the appropriate cellular chip set. Examples of the legacy RAN 120 may include those networks that are generally labeled as 2G and/or 3G networks and may include circuit switched voice calls and packet switched data operations. Those skilled in the art will understand that the cellular providers may also deploy other types of networks, including further evolutions of the cellular standards, within their cellular networks. The WLAN 124 may include any type of wireless local area network (WiFi, Hot Spot, IEEE 802.11x networks, etc.). Those skilled in the art will understand that there may be thousands, hundreds of thousands or more of different WLANs deployed in the United States alone. For example, the WLAN 124 may be the user's home network, the user's work network, a public network (e.g., at a city park, coffee shop, etc.). Generally, the WLAN 124 will include one or more access points that allow the client stations 110-114 to communicate with the WLAN 124. However, as noted above, the exemplary embodiments relate to the UEs 110-114 utilizing the LTE-RAN 122 to perform VoLTE calls.

In addition to the networks 120-124, the network arrangement 100 also includes a cellular core network 130 and the Internet 140. The cellular core network 130, the legacy RAN 120, and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

The network arrangement 100 also includes an IP Multimedia Subsystem (IMS) 150. The IMS 150 may be generally described as an architecture for delivering multimedia services to the UEs 110-114 using the IP protocol. The IMS 150 may include a variety of components to accomplish this task. For example, a typical IMS 150 includes a Home Subscriber Server (HSS) that stores subscription information for a user of the UEs 110-114. This subscription information is used to provide the correct multimedia services to the user such as a VoLTE call. The IMS 150 may communicate with the cellular core network 130 and the Internet 140 to provide the multimedia services to the UEs 110-114. The IMS 150 is shown in close proximity to the cellular core network 130 because the cellular provider typically implements the functionality of the IMS 150. However, it is not necessary for this to be the case such as when the IMS 150 is provided by another party.

Thus, the network arrangement 100 allows the UEs 110-114 to perform functionalities generally associated with computers and cellular networks. For example, the UEs 110-114 may perform the VoLTE calls to other parties, may browse the Internet 140 for information, may stream multimedia data to the client devices 110-114, etc.

The network arrangement 100 may also include a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

The network services backbone 160 may be provided by any entity or a set of entities. In one example, the network services backbone 160 is provided by the supplier of one or more of the UEs 110-114. In another example, the network services backbone 160 is provided by the cellular network provider. In still a further example, the network services backbone 160 is provided by a third party unrelated to the cellular network provider or the supplier of the UEs 110-114.

The exemplary embodiments relate to the UEs 110-114 connecting to the LTE-RAN 122 via an evolved Node B (eNB) 122A. The eNB 122A may be configured with a Discontinuous Reception (DRX) functionality. More specifically, the eNB 122A may be configured with a CDRX functionality. Initially, the UEs 110-114 may establish a connection to the LTE-RAN 122. Those skilled in the art will understand that any association procedure may be performed for the UEs 110-114 to connect to the LTE-RAN 122. For example, as discussed above, the LTE-RAN 122 may be associated with a particular cellular provider where the UE 110-114 and/or the user thereof has a contract and credential information (e.g., stored on a SIM card). Upon detecting the presence of the LTE-RAN 122, the UEs 110-114 may transmit the corresponding credential information to associate with the LTE-RAN 122. More specifically, the UEs 110-114 may associate with a specific access point (e.g., the eNB 122A of the LTE-RAN 122). Thus, the UEs 110-114 that are associated with the eNB 122A may utilize the CDRX functionality when configured to perform this feature.

As discussed above, the CDRX functionality may relate to the synchronization of the UEs 110-114 with the eNB 122A. To properly be prepared for demodulating transmitted signals (i.e., received signals) and/or transmitting signals or data (i.e., transmitted data), the UE must be configured with proper settings. Specifically, properties related to the physical layer of the transceiver used to connect to the LTE-RAN 122 must be known. For example, the channel (e.g., band of frequencies) must be known for the incoming signal in order for it to be properly received. In another example, the wireless properties including timing parameters must be known for data packets to be properly transmitted. Therefore, control channel information such as physical downlink control channel (PDCCH) information including grant information, reference symbols, etc. may be received in a background operation during connection with the LT-RAN 122.

A UE connected to the LTE-RAN 122 may utilize a predetermined manner of receiving the control channel information. Specifically, the CDRX functionality may be used. For example, in a LTE Internet protocol (IP) Multimedia Subsystem (IMS) enabled network, the UE is expected to have specified uplink transmission opportunities based upon the control channel information that is received according to the known schedule. The CDRX functionality relates to utilizing the active mode of processing and the resting mode of processing in order to conserve power. The CDRX functionality may include a specification or schedule according to which the control channel information is received. Therefore, when the control channel information is to be received, the UE may wake the receiver such that the receiver enters an active mode in preparation of receiving this information. The time at which the control channel information is received may be called the "onDuration" of the CDRX cycle. The onDuration relates to a number of frames over which the UE reads downlink control channel information every CDRX cycle before entering the sleep mode or using the resting mode. Thus, at all other times during the CDRX cycle, the UE may utilize the resting mode. However, as will be described in further detail below, when the UE requests an uplink grant to transmit data and subsequently transmits that data (thereby waking the transmitter which is otherwise asleep), the UE wakes the receiver to receive a response from the LTE-RAN 122 as to whether the data transmitted by the UE was received by the LTE-RAN 122 via an Acknowledgement (ACK) or a negative ACK (NACK). Furthermore, as will be described in further detail below, when a NACK is received, the UE wakes the transmitter to again transmit the data that was not properly received by the LTE-RAN 122.

Figure 2:
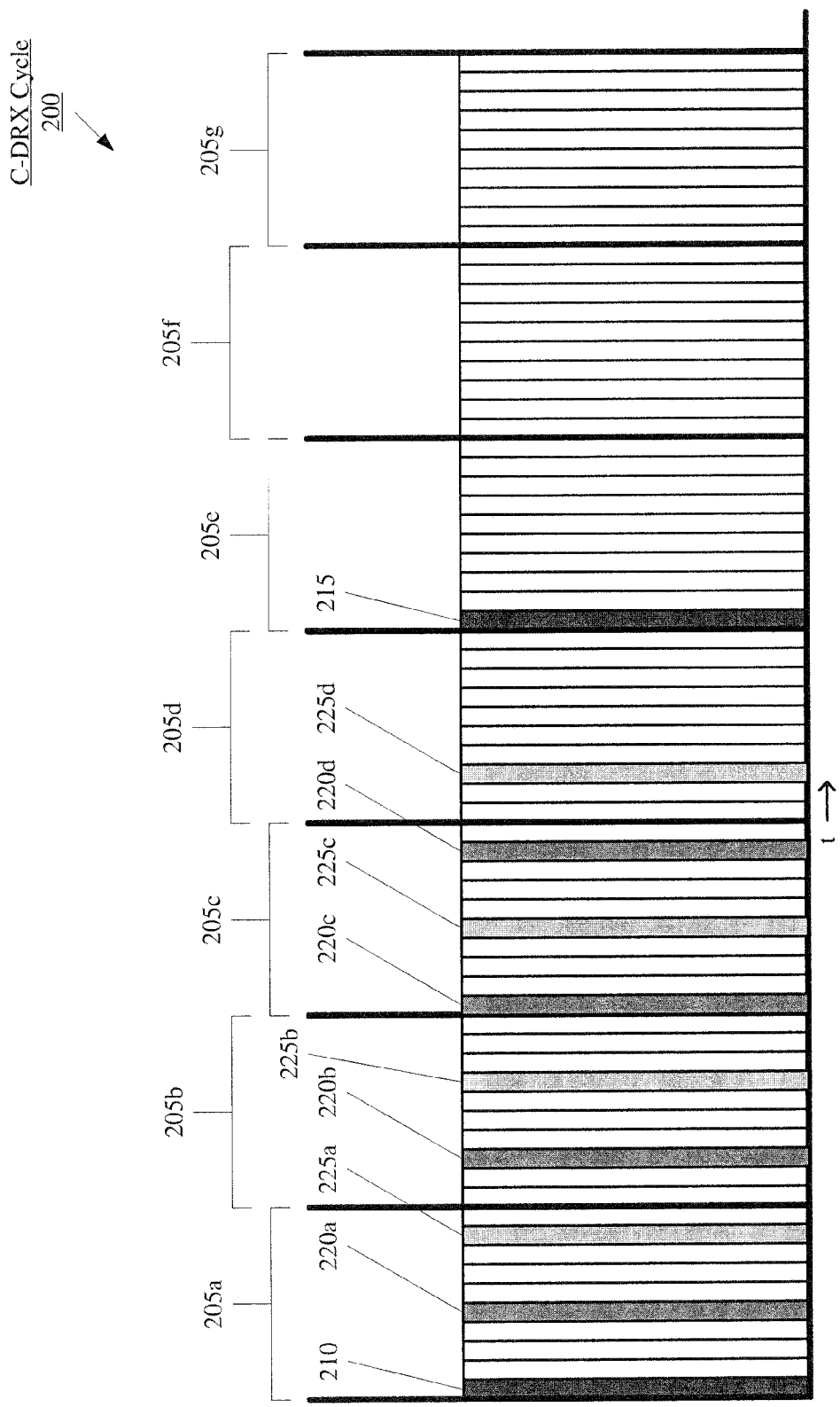
FIG. 2 shows an exemplary CDRX cycle used by the exemplary user equipment of FIG. 1.

FIG. 2 shows an exemplary CDRX cycle 200 used by the UEs of FIG. 1. The CDRX cycle 200 may have a predetermined duration such as 40 ms, 20 ms, etc. In the case that the CDRX cycle 200 is a long cycle used during a particular application of the UE such as a VoLTE call, the predetermined duration may be 40 ms (since a voice packet is often measured in 20 ms intervals such that the 40 ms duration incorporates two voice packets). Thus, only considering the receiver of the UE, at a time 0, there may be an onDuration for the control channel information to be received in which the active mode is used; subsequently, upon the onDuration lapsing, the resting mode is used; then at time 40 ms, there may be another onDuration; subsequently, the resting mode is again used until time 80 ms; etc.

The CDRX cycle 200 may be based upon a known specification or schedule. Therefore, the scheduling application may utilize this CDRX cycle 200 to define when transmissions are performed (based upon uplink grants) and when data is to be received (based upon downlink grants and the specification). The CDRX cycle 200 may include a plurality of frames 205a-g. Each frame 205a-g may have a duration of 10 ms. Each frame 205a-g may also include a plurality of equal duration subframes having a duration of 1 ms. Accordingly, with a predetermined cycle duration of 40 ms, a first CDRX cycle may include the frames 205a-d.

During these subframes, the control channel information may be received as indicated by the CDRX cycle 200. For example, as shown in FIG. 2, a first subframe 210 of the frame 205a (dark gray shading) may be a time when the control channel information is received. A first subframe 215 of the frame 205e (dark gray shading) may be another time when the control channel information is received as this is one cycle duration after the frame 205a (e.g., 40 ms). Accordingly, the OnDuration when the receiver of the UE is always activated to potentially receive the control channel information may be represented with the subframes 210, 215. However, it should be noted that the use of a single subframe in a given cycle (four subframes) is only exemplary. Those skilled in the art will understand that the OnDuration may include more than one consecutive subframe in which the control channel information may be received. However, those skilled in the art will appreciate that when a particular application such as the VoLTE call is being performed, the OnDuration duration may be configured with a minimal amount such that only a single subframe is used.

Also as shown in FIG. 2, the control channel information received in the first subframe 210 of the frame 205a may include PDCCH information that indicates when an uplink transmission (i.e., transmission from the UE to the LTE-RAN 122) in a physical uplink shared channel (PUSCH) may be performed. Thus, the receiver of the UE may be awake during the OnDuration. The CDRX 200 may be configured with an inactivity timer (e.g., 4 ms) which defines a duration or consecutive transmission time intervals (TTIs) during which the UE monitors the PDCCH when the uplink grant is given by the LTE-RAN 122. Thus, the inactivity timer may be represented from the first subframe 210 to a subframe 220a. Because the inactivity timer represents a monitoring period, the receiver of the UE may remain awake. It should be noted that the transmitter of the UE may be asleep during this entire duration. It should also be noted that the inactivity timer being greater than the OnDuration is only exemplary. That is, the OnDuration being 1 ms (i.e., 1 subframe) while the inactivity timer being 4 ms (i.e., 4 subframes) is only exemplary. Those skilled in the art will understand that the inactivity timer may extend beyond the OnDuration such as the exemplary embodiment shown in FIG. 2. However, those skilled in the art will also understand that the inactivity timer may be set to be within or coincide with the OnDuration so that the receiver is not required to be awake for a period longer than the OnDuration (since the OnDuration defines a time when the receiver must be awake).

As shown, the fifth subframe 220a of the frame 205a (medium gray shading) may be when the uplink grant is exercised such that data is transmitted over the PUSCH. Accordingly, the transmitter of the UE may be awake during this subframe to perform the transmission. Since the receiver of the UE is not required, the receiver may be placed in the sleep mode during this period after the OnDuration and/or the inactivity timer. The CDRX cycle 200 shows that the transmitter is only required to be awake for one subframe to perform the transmission. However, it should be noted that the transmission may take more than one subframe to complete.

Subsequently, since a transmission was made, the UE may be configured to receive a response in the form of an ACK or a NACK from the LTE-RAN 122. More specifically, the response may be received at the ninth subframe 225a of the first frame 205a. Accordingly, the receiver of the UE may be awake during this period (e.g., this subframe) to perform the reception. Since the transmitter is not required, the transmitter may be placed in the sleep mode during this period after transmitting the data in subframe 220a. The CDRX cycle 200 shows that the receiver is only required to be awake for one subframe to perform the reception. However, it should be noted that the reception may take more than one subframe to complete.

The CDRX cycle 200 further illustrates additional transmission subframes 220b, c, d and additional reception subframes 225b, c, d. The transmission subframes 220a-d and the reception subframes 225a-d may be separated with a known subframe duration. As illustrated, this known subframe duration may be 4 ms. Thus, given a subframe N (e.g., subframe 210), the transmission may be at N+4 (e.g., subframe 220a). Likewise, the reception may be at N+8 (e.g., subframe 225a). This transmission and reception pattern may continue such that the transmission subframes 220b, c, d are located at N+12, N+20, and N+28, respectively, while the reception subframes 225b, c, d are located at N+16, N+24, and N+32, respectively. Those skilled in the art will understand that the control channel information may include further grants for downlink and/or uplink and they may be performed at any number of locations within the frames 205a-d of a given CDRX cycle duration.

With regard to a single uplink transmission, the additional transmission subframes 220b, c, d may be used based upon the responses being received. For example, if the UE receives a NACK at the subframe 225a, the NACK may indicate that the data is to be re-transmitted. Thus, at subframe 220b, the transmission may be re-attempted. Subsequently, a response may be received at subframe 225b. This transmission attempt process may continue until the LTE-RAN 122 transmits an ACK in response to the data being transmitted from the UE. When the ACK is received, the transmitter may be deactivated as no further re-transmission may be required. However, until the ACK is received, the UE may be required to wake the transmitter for each additional subframe 220b, c, d when an attempt needs to be made.

Those skilled in the art will understand that the receiver of the UE may still be waken up during the additional subframes 225b, c, d despite the ACK being received in the subframe 225a. For example, the UE and LTE-RAN 122 may utilize a Hybrid Automatic Repeat Request (HARQ) functionality or other error checking functionality when transmitting the data. This may decrease a likelihood of false positives or requests for re-transmissions. Specifically, the HARQ functionality may include error correcting information such that a transmission may be improperly received but still updated to be the intended data. Thus, when the LTE-RAN 122 receives the data from the UE at subframe 220a, the LTE-RAN 122 may determine whether the transmission was properly received. Performing the error check or other determination functionality, the LTE-RAN 122 transmits a response as an ACK when determined to be correct while transmitting a response as a NACK when determined to be incorrect. However, those skilled in the art will understand that there is still a possibility that the first transmission of the ACK is a false positive. Although mechanisms exist that improve the likelihood that false positives are decreased, such a chance is not completely eliminated. For example, a lower functionality of the LTE-RAN 122 may utilize a cursory determination whereas a higher functionality of the LTE-RAN 122 may utilize a more thorough determination. The higher functionality of the LTE-RAN 122 may attempt to utilize the previously acknowledged transmission but determine that the transmission was indeed improperly received. The LTE-RAN 122 may therefore have transmitted an ACK at subframe 225a but subsequently transmit a NACK at subframe 225b (after the later determination).

In view of the above, the UE may be configured to wake the receiver at each subframe marked for potential reception, namely subframes 225b, c, d. In a specific example, the UE wakes the receiver to receive the control channel information at subframe 210 in which an uplink grant is received. After receiving the control channel information and/or upon expiry of the OnDuration and/or the inactivity timer, the receiver may be placed back to sleep. At subframe 220a, the UE wakes the transmitter for the transmission to be made from the UE to the LTE-RAN 122. After the transmission, the UE may place the transmitter back to sleep. For this example, the LTE-RAN 122 may perform an initial check of the transmission and determine that it is proper. Thus, an ACK may be transmitted. At subframe 225a, the UE wakes the receiver for the reception of the ACK from the LTE-RAN 122 to be performed. The UE may place the receiver back to sleep. With the proper transmission of the data at subframe 220a, the UE may select to keep the transmitter asleep during subframe 220b. However, upon further analysis of the data, the LTE-RAN 122 may have determined that the data includes an error. Thus, the LTE-RAN 122 may transmit a NACK. Given the scheduling of events based upon the CDRX 200, the UE may wake the receiver at subframe 225b regardless of the reception of the ACK at subframe 225a due to these types of circumstances. Accordingly, the UE may receive the NACK at subframe 225b. Subsequently, a transmission process may again be performed at subframe 220c and a response may be received at subframe 225c.

Although the CDRX cycle 200 enables an increased power conservation compared to continuous wake states of the transmitter and receiver of the UE, the exemplary embodiments provide mechanisms that further increase the power conservation of the UE. As will be described below, the exemplary embodiments provide a first mechanism that deactivates the transmitter when predetermined circumstances exist. The exemplary embodiments further provide a second mechanism that deactivates the receiver when further predetermined circumstances exist. Furthermore, the first and second mechanisms may be used in conjunction to additionally increase the power conservation.

Figure 3:
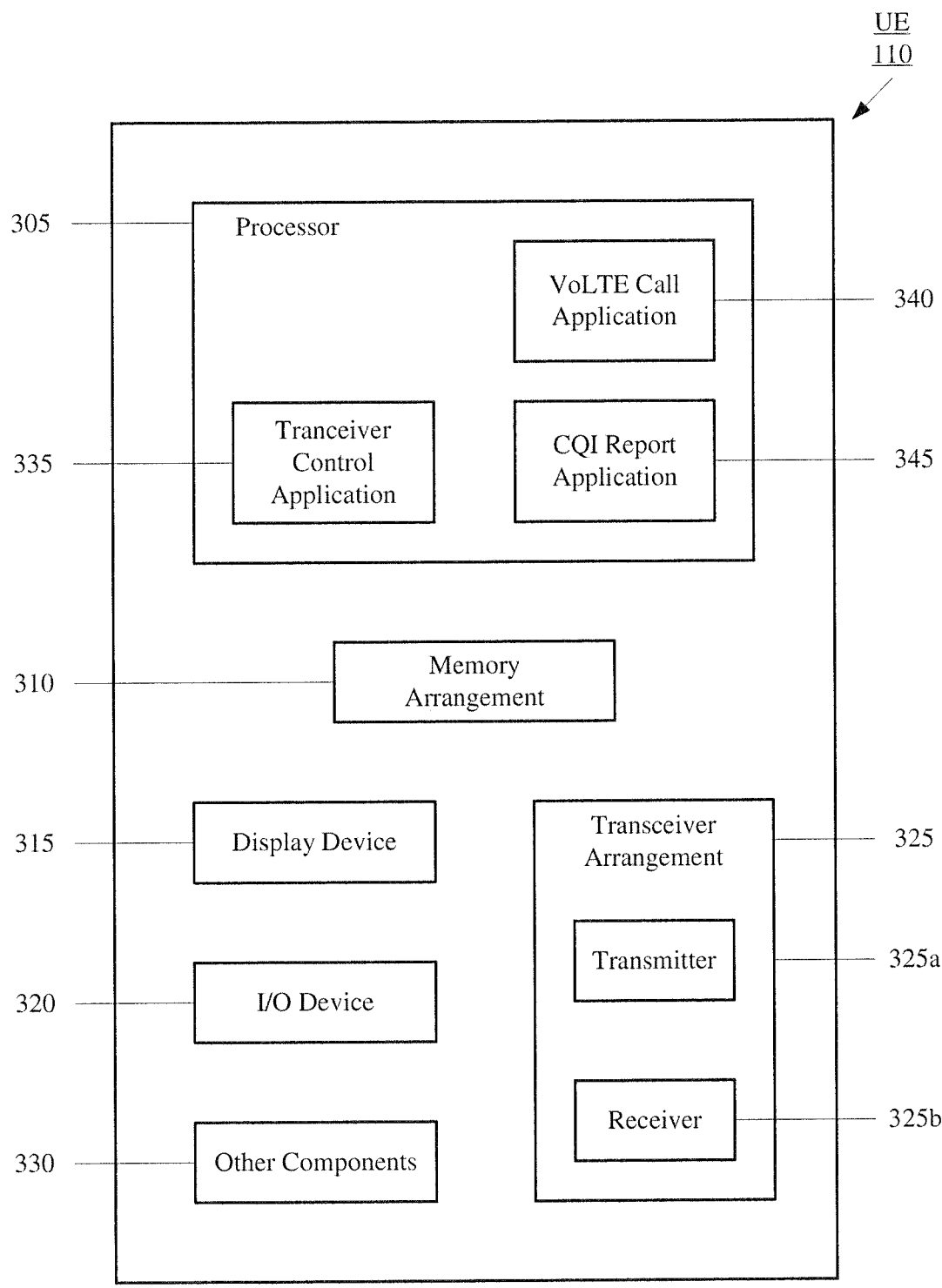
FIG. 3 shows an exemplary user equipment configured to optimize power conservation.

FIG. 3 shows the UE 110 of the network arrangement 100 of FIG. 1 that is configured to optimize power conservation. Specifically, the UE 110 is configured to execute a plurality of applications that perform predetermined functionalities based upon rules or based upon present circumstances. For exemplary purposes, the UE 110 may also represent the UEs 112, 114. However, it should be noted that the other UEs 112, 114 may not necessarily be capable of performing the functionalities described below with regard to the UE 110.

The UE 110 may represent any electronic device that is configured to perform wireless functionalities and may be representative of one or more of the UEs 110-114. For example, the UE 110 may be a portable device such as a smartphone, a tablet, a phablet, a laptop, etc. In another example, the UE 110 may be a client stationary device such as a desktop terminal. The UE 110 may be configured to perform cellular and/or WiFi functionalities. The UE 110 may include a processor 305, a memory arrangement 310, a display device 315, an input/output (I/O) device 320, a transceiver arrangement 325 including a transmitter 325a and a receiver 325b, and other components 330. The other components 330 may include, for example, an audio input device, an audio output device, a battery that provides a limited power supply, a data acquisition device, ports to electrically connect the UE 110 to other electronic devices, etc.

The processor 305 may be configured to execute a plurality of applications of the UE 110. For example, the applications may include a web browser when connected to a communication network via the transceiver 325. The use of the web browser may entail requesting uplink grants to transmit requests to the web browser or downlink grants to receive data from a website. In another example, the processor 305 may execute a transceiver control application 335. As will be described in further detail below, the transceiver control application 335 may be configured with different predetermined rules to activate or deactivate the transmitter 325a and/or the receiver 325b with respect to operation of the CDRX cycle 200. In yet another example, the processor 305 may execute a VoLTE call application 340 that enables the UE 110 to perform a VoLTE call functionality. In yet another example, the processor 305 may execute a Channel Quality Indicator (CQI) report application 345 that generates a CQI report to be provided to the LTE-RAN 122, particularly when the VoLTE call functionality is being performed.

It should be noted that the above noted applications each being an application (e.g., a program) executed by the processor 305 is only exemplary. The functionality associated with the applications may also be represented as a separate incorporated component of the UE 110 or may be a modular component coupled to the UE 110, e.g., an integrated circuit with or without firmware. In addition, in some UEs, the functionality described for the processor 305 is split among two processors, a baseband processor and an applications processor. The exemplary embodiments may be implemented in any of these or other configurations of a UE.

The memory 310 may be a hardware component configured to store data related to operations performed by the UE 110. Specifically, the memory 310 may store data related to the various applications 335-345. For example, the VoLTE call application 340 may utilize a phone book functionality that stores contact information for other users and UEs. In another example, the memory 310 may store the rules and policies used by the transceiver control application 235. The display device 315 may be a hardware component configured to show data to a user while the I/O device 320 may be a hardware component that enables the user to enter inputs. It should be noted that the display device 315 and the I/O device 320 may be separate components or integrated together such as a touchscreen.

The transceiver 325 may be a hardware component configured to transmit data via the transmitter 325a and receive data via the receiver 325b. The transceiver 325 may enable communication with the LTE-RAN 122 or with other electronic devices directly or indirectly through the LTE-RAN 122 to which the UE 110 is connected. The transceiver 325 may operate on a variety of different frequencies or channels (e.g., set of consecutive frequencies) that are related to the VoLTE call functionality. Thus, an antenna (not shown) coupled with the transceiver 325 may enable the transceiver 325 to operate on the LTE frequency band.

As discussed above, the exemplary embodiments utilize the transceiver control application 335 to define when the transmitter 325a and the receiver 325b are to be activated/deactivated with respect to the CDRX cycle 200. In contrast to the above description of utilizing the transmitter 325a and the receiver 325b, the transceiver control application 335 provides additional mechanism to further improve power conservation by deactivating the transmitter 325a and/or the receiver 325b when the predetermined rules/policies are configured in this manner or when the transceiver control application 335 determines when certain circumstances are presently being experienced by the UE 110.

In a first mechanism, the transceiver control application 335 deactivates the transmitter 325a based upon conditions currently being experienced by the UE 110. As discussed above, when the UE 110 is given an uplink grant at subframe N (transmitter 325a asleep and receiver 325b awake), the UE 110 transmits the data at subframe N+4 (transmitter 325a awake and receiver 325b asleep) and awaits a response at subframe N+8 (transmitter 325a asleep and receiver 325b awake). Despite receiving an ACK from the LTE-RAN 122, the UE 110 still wakes the receiver 325b at subframes N+16, N+24, and N+32 in case a follow-up NACK is received in which the transmitter 325a is subsequently waken up for a re-transmission.

The first mechanism provides a condition that deactivates the transmitter 325a after the first transmission based upon a Block Error Rate (BLER). The BLER defines a ratio of a number of erroneous blocks of data to a total number of the blocks of data. Accordingly, the BLER may be a ratio calculated over a period of time. For example, if the BLER is to be calculated based upon M frames, the UE 110 may perform the above described transmission/reception procedure and store the instances or portions of the instances where the number of proper transmissions versus the number of improper transmissions. This information may be stored in the memory 310. The UE 110 may continue to monitor this BLER continuously in a cumulative manner or for the previous M frames from a current time.

Based upon the calculated BLER, the transceiver control application 335 may deactivate the transmitter 325a once the intended data is transmitted at subframe N+4 (where subframe N is when the UE 110 receives the uplink grant). For example, the transceiver control application 335 may set a predetermined BLER value to 10%. Thus, when the previous M frames indicates that the BLER is less than 10%, the transceiver control application 335 may automatically deactivate the transmitter 325a for the duration of the current frame or some other predetermined length (e.g., multiple frames). Those skilled in the art will understand that a low BLER value may be indicative of data transmissions being properly transmitted/received. Thus, when such a high rate of correct transmissions is being experienced through the connection between the UE 110 and the LTE-RAN 122, the transceiver control application 335 shuts down the transmitter 325a.

It should be noted that the use of the predetermined BLER value being 10% is only exemplary. That is, more strict (less than 10%) or more lax (more than 10%) may be used as the setting to determine when the transceiver control application 335 deactivates the transmitter 325a. In view of how this feature operates, those skilled in the art will understand that the lower the predetermined BLER value is set, the higher the probability that the response will be an ACK rather than a NACK. However, a lower setting of the predetermined BLER value may reduce the number of opportunities to utilize this feature. It should also be noted that the use of the BLER is only exemplary. Those skilled in the art will understand that there are a variety of different network measurements that may relate to data transmissions and any of these measurements may also form the basis in which the transceiver control application 335 operates.

Furthermore, it should be noted that the receiver 325b may be utilized in different manners with regard to this functionality. For example, to continue to track the BLER, the transceiver control application 335 may continue to monitor the PDCCH for the response from the transmission. Thus, the receiver 325b may be woken up at each of the predetermined time periods: subframes 225a-d. However, the power conservation is still improved since the transmitter 325a remains asleep for the remainder of the duration of the frame. In another example, if the calculated BLER value is below a further predetermined BLER value (e.g., half the original predetermined BLER value), the transceiver control application 335 may further deactivate the receiver 325b so that the response is also not being monitored. In this manner, the power conservation may further be improved since both the transmitter 325a is awake at subframe N+4 and asleep thereafter and the receiver 325b is awake at subframe N+8 and asleep thereafter.

It should additionally be noted that the use of the long cycle duration of 40 ms with particular regard to this first mechanism is only exemplary. Those skilled in the art will understand that there are various different manners in which the CDRX cycle 200 may be used. However, the exemplary embodiments may be used for any of these CDRX cycles in a substantially similar manner as that discussed above.

The second mechanism provides an updated manner in which CQI reports are transmitted to the LTE-RAN 122, with particular emphasis on when the UE 110 is executing the VoLTE call application 340. During a VoLTE call, power consumption is an important factor for performance. Thus, to conserve power, the CDRX functionality is utilized with the VoLTE call application 340. However, when the VoLTE call application 340 is being executed, there may be an additional feature that is utilized in which the CQI report generated by the CQI report application 345 is transmitted to improve a quality of the VoLTE call. Throughout the duration of the VoLTE call, the CQI report may be continually generated and transmitted to the LTE-RAN 122. In one manner, the CQI report may be transmitted aperiodically. In this scenario, the CQI report may be transmitted as requested. In another manner, the CQI report may be transmitted periodically. For example, the CQI report may be transmitted every 5 ms. The CQI report may be one type of data that the UE 110 requests an uplink grant to transmit the CQI report at subframe N+4 when receiving the uplink grant at subframe N. In a substantially similar manner discussed above, the transmitter 325a may be awake at its predetermined subframes to transmit the CQI report and subsequently asleep. The receiver 325b may also be awake at its predetermined subframes to receive the response from the LTE-RAN 122. In fact, the response is expected at subframes N+8, N+16, N+24, and N+32 depending upon a number of HARQ re-transmissions that are configured for the CQI report. Again, the receiver 325b may be awake at each of the predetermined subframes.

The second mechanism is configured so that the transceiver control application 335 controls when the receiver 325b is awake to receive the response from the LTE-RAN 122. Specifically, this operation may be based upon when the response is an ACK. For example, if the UE 110 is given an uplink grant at subframe N, the UE 110 may transmit the CQI report at subframe N+4. The UE 110 may receive a response at subframe N+8. If the response at this subframe is an ACK, the transceiver control application 335 deactivates the receiver 325b for the remainder of the duration of the frame. That is, the receiver 325 is no longer awake for subframes N+16, N+24, and N+32. If the response at the subframe N+8 is a NACK, the transceiver control application 335 may continue by activating the receiver 325b at the following reception subframe until the ACK is received using a substantially similar re-transmission operation discussed above.

It should be noted that this second mechanism may include a further feature in which the UE 110 continues to monitor the PDCCH for a response from the LTE-RAN 122. However, the second mechanism may be configured such that the CQI report is not transmitted except when the CDRX cycle 200 is in a non-OnDuration and inactive timer period. In this manner, the transmitter 325a may be deactivated for a greater duration of time that improves the power conservation when the VoLTE call application 340 is being executed.

Figure 4:
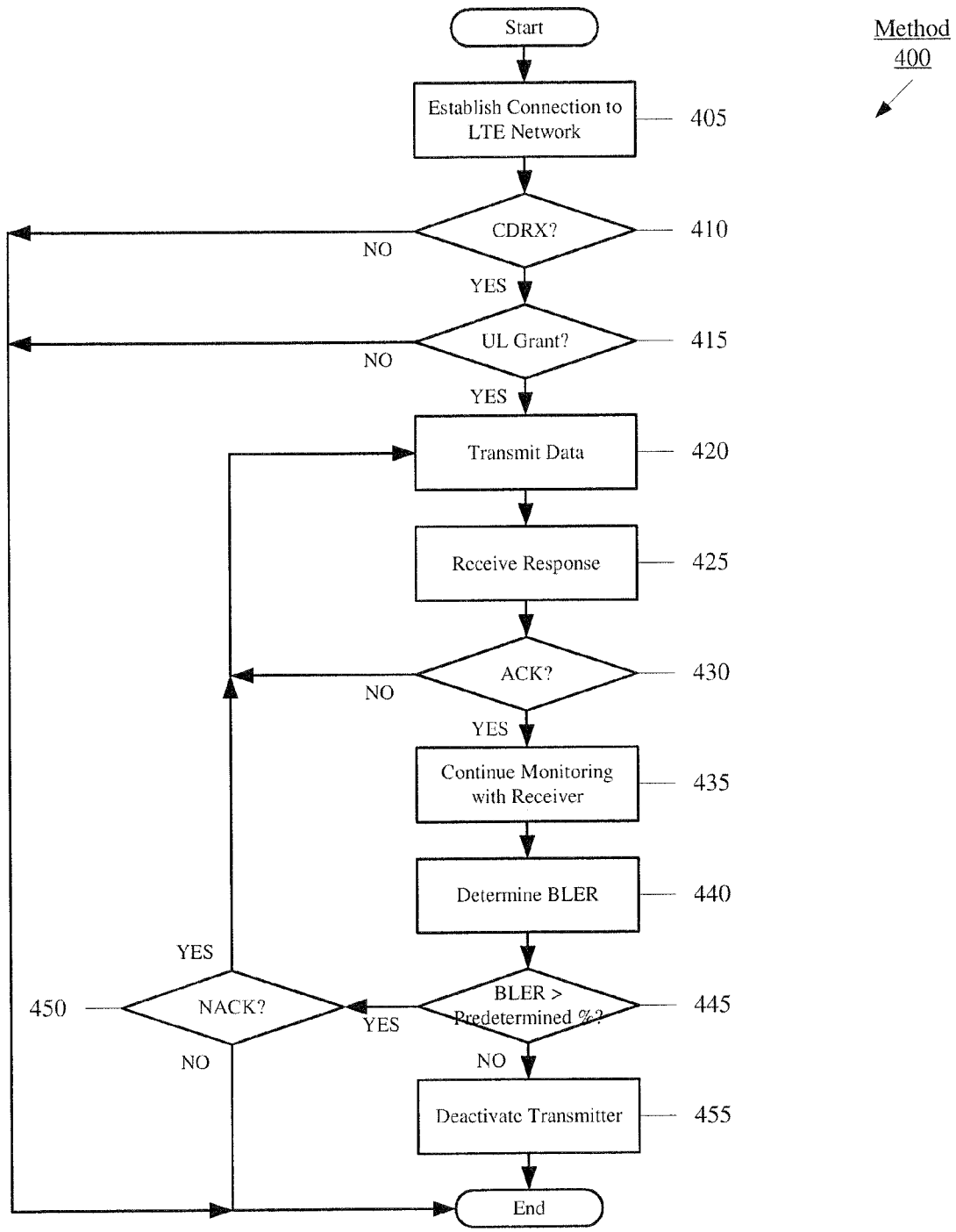
FIG. 4 shows an exemplary method for deactivating a transmitter during a CDRX cycle.

FIG. 4 shows an exemplary method 400 for deactivating the transmitter 325a of the transceiver 325 in the UE 110 during the CDRX cycle 200. The method 400 relates to the first mechanism discussed above in which the transceiver control application 335 determines when to deactivate the transmitter 325a based upon a BLER value. The method 400 will be described with regard to the network arrangement 100 of FIG. 1, the CDRX cycle 200 of FIG. 2, and the UE 110 of FIG. 3.

In step 405, the UE 110 establishes a connection with the LTE-RAN 122 via the eNB 122A. As discussed above, any association process may be used. The eNB 122A and the UE 110 may each be configured with the CDRX functionality. Thus, in step 410, a determination is made whether the CDRX functionality is usable. If the CDRX functionality is unavailable, the UE 110 and the eNB 122A may operate under known functionalities. If the CDRX functionality is available, the UE 110 continues the method 400 to step 415.

In step 415, with the CDRX cycle 200 in place, the UE 110 determines whether an uplink grant has been given by the LTE-RAN 122 (specifically by the eNB 122A). Specifically, at a subframe N (e.g., subframe 210), the control channel information received by the UE 110 may indicate the uplink grant. Thus, the receiver 325b may be awake while the transmitter 325a may be asleep. If no uplink grant has been given, the UE 110 may operate under known functionalities. If the uplink grant is given, the UE 110 continues the method 400 to step 420. In step 420, the UE 110 transmits the data. Specifically, the data may be transmitted based upon the known times such as at subframe N+4 (e.g., subframe 220a). In step 425, the UE 110 receives a response. Specifically, the response (e.g., ACK or NACK) may be received based upon the known times such as at subframe N+8 (e.g., subframe 225a).

In step 430, the transceiver control application 335 determines whether the response is an ACK. If the response is a NACK, the transceiver control application 335 enables the transmitter to be awake at an ensuing transmission subframe N+12. Thus, the UE 110 returns the method 400 to step 420. However, if the response is an ACK, the transceiver control application 335 initially maintains the operation of the receiver 325b to monitor the ensuing reception subframes N+16, N+24, and N+32 (in case a follow-up NACK is received).

With regard to the transmitter 325a, in step 440, the transceiver control application 335 determines the BLER value. As discussed above, the BLER value may be determined prior to a current time that the transceiver control application 335 is determining the manner of operation of the transmitter 325a. For example, the previous M frames may form the basis in which to calculate the BLER value. In step 445, the transceiver control application 335 determines whether the calculated BLER value is greater than a predetermined BLER value. For example, the predetermined BLER value may be set to 10%. If the BLER value is determined to be greater than the predetermined BLER value, the UE 110 continues the method to step 400 to step 450. In step 450, the UE 110 determines whether the follow-up NACK is indeed received from the LTE-RAN 122. If the follow-up NACK is received, the UE 110 returns the method 400 to step 420 to re-transmit the data. However, if the UE 110 does not receive any follow-up NACK in any of the ensuing reception subframes, the UE 110 may assume that the data was properly received.

Returning to step 445, if the transceiver control application 335 determines that the BLER value is less than the predetermined BLER value, the transceiver control application 335 continues the method 400 to step 455. In step 455, the transceiver control application 335 deactivates the transmitter 325a such that the transmitter 325a is no longer available to re-transmit the data for the remainder of the frame. Those skilled in the art will understand that such a process may inadvertently increase the BLER value when the follow-up NACK is to be received. However, given the predetermined BLER value, there is a greater likelihood that the data was properly received upon receiving any ACK from the LTE-RAN 122.

Figure 5:
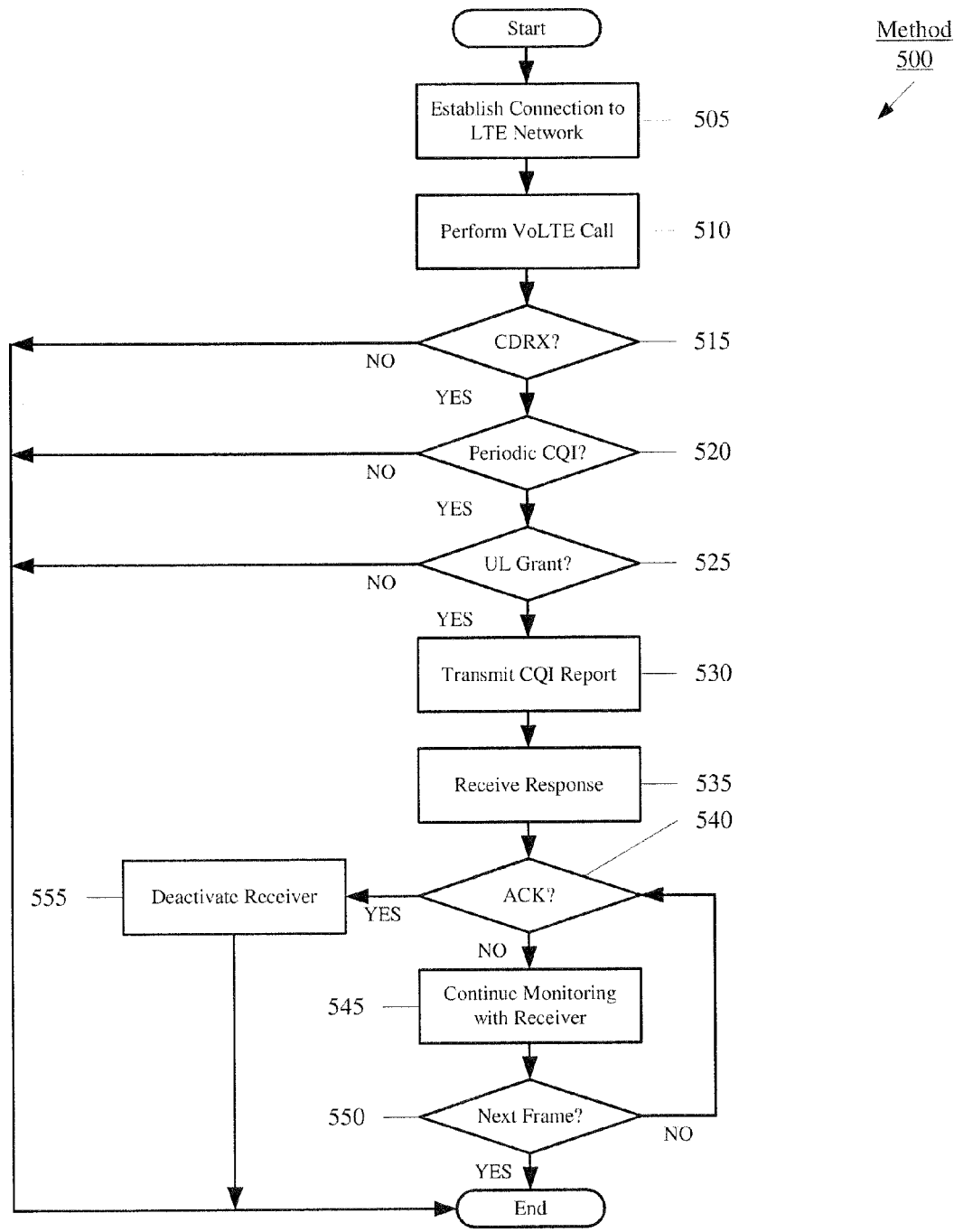
FIG. 5 shows an exemplary method for deactivating a receiver during a CDRX cycle.

FIG. 5 shows an exemplary method 500 for deactivating the receiver 325b of the transceiver 325 in the UE 110 during the CDRX cycle 200. The method 500 relates to the second mechanism discussed above in which the transceiver control application 335 determines when to deactivate the receiver 325b based upon a response from the LTE-RAN 122. The method 500 will be described with regard to the network arrangement 100 of FIG. 1, the CDRX cycle 200 of FIG. 2, and the UE 110 of FIG. 3.

In step 505, the UE 110 establishes a connection with the LTE-RAN 122 via the eNB 122A. As discussed above, any association process may be used. The eNB 122A and the UE 110 may each be configured with the CDRX functionality. In step 510, the UE 110 performs a VoLTE call using the VoLTE call application 340. In step 515, a determination is made whether the CDRX functionality is usable. If the CDRX functionality is unavailable, the UE 110 and the eNB 122A may operate under known functionalities for the VoLTE call. If the CDRX functionality is available, the UE 110 continues the method 500 to step 520. In step 520, a determination is made whether the CQI is configured in a periodic manner. If the CQI is to be transmitted aperiodically, the UE 110 operates under known functionalities. If the CQI is to be transmitted periodically, the UE 110 continues the method 500 to step 525.

In step 525, with the CDRX cycle 200 in place, the UE 110 determines whether an uplink grant has been given by the LTE-RAN 122 (specifically by the eNB 122A). Specifically, at a subframe N (e.g., subframe 210), the control channel information received by the UE 110 may indicate the uplink grant. Thus, the receiver 325b may be awake while the transmitter 325a may be asleep. If no uplink grant has been given, the UE 110 may operate under known functionalities. If the uplink grant is given, the UE 110 continues the method 500 to step 530. In step 530, the UE 110 transmits the CQI report generated by the CQI report application 345. Specifically, the CQI report may be transmitted based upon the known times such as at subframe N+4 (e.g., subframe 220a). In step 535, the UE 110 receives a response. Specifically, the response (e.g., ACK or NACK) may be received based upon the known times such as at subframe N+8 (e.g., subframe 225a).

In step 540, the transceiver control application 335 determines whether the response is an ACK. If the response is a NACK, the transceiver control application 335 continues monitoring with the receiver 325b to determine whether an ACK is provided. However, this may lapse into a following frame. Thus, in step 550, the transceiver control application 335 determines whether the next frame has been reached. If the next frame has been reached, the UE 110 may determine a following course of action that may include returning the method 500 to step 525 (not shown). However, if the next frame has not been reached, the UE 110 may return the method 500 to step 540 to continue monitoring for the ACK from the LTE-RAN 122.

When the ACK is received (e.g., after the first reception subframe 225a), the transceiver control application 335 may continue the method 500 to step 555. In step 555, the transceiver control application 335 may deactivate the receiver 325b. That is, the receiver 325b may remain deactivated for any ensuing reception subframes to conserve power. It should be noted that the method 500 may include further steps such as the transceiver control application 335 restricting the CQI report to only be transmitted during a non-OnDuration and inactive timer period.

The exemplary embodiments provide a system and method of controlling a transmitter and a receiver during a CDRX cycle of a UE to optimize a power conservation. The UE may utilize the CDRX cycle and may be configured to transmit and receive data based upon predetermined subframes of the CDRX cycle. However, based upon selected conditions, the exemplary embodiments provide mechanisms to control the manner in which the transmitter and receiver are activated/deactivated. In a first mechanism, the exemplary embodiments may utilize a BLER value calculated prior to a current time to determine whether a transmitter is to be deactivated. In a second mechanism, the exemplary embodiments may determine whether to deactivate a receiver based upon a response received from a transmission from the UE to the LTE network.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A user equipment, comprising:
a transceiver including a transmitter and a receiver, the transceiver configured to enable the user equipment to establish a connection with a Long Term Evolution (LTE) network, the user equipment and the LTE network configured with and utilizing a Connected Discontinuous Reception (CDRX) functionality; and
a processor configured to control an operation of the transceiver by:
receiving an uplink grant from the LTE network at a first subframe of a frame of a cycle of the CDRX functionality;
transmitting data based upon the uplink grant at a predetermined second subframe subsequent to the first subframe in the frame;
receiving a response from the LTE network corresponding to one of an acknowledgement (ACK) and a negative ACK (NACK) at a predetermined third subframe subsequent to the second subframe in the frame; and
deactivating the transmitter for a remainder of the frame based upon an error value associated with the user equipment during a duration while connected to the LTE network prior to when the ACK is received.

2. The user equipment of claim 1, wherein the error value is a Block Error Rate (BLER).

3. The user equipment of claim 2, wherein the processor is further configured to control the operation of the transceiver by:
determining the BLER for a predetermined number of prior frames relative to the frame; and
comparing the BLER to a predetermined BLER threshold value,
wherein the transmitter is deactivated when the BLER is less than the predetermined BLER threshold value.

4. The user equipment of claim 3, wherein the predetermined BLER threshold value is 10%.

5. The user equipment of claim 3, wherein the processor is further configured to control the operation of the transceiver by:
activating the receiver to monitor for a follow-up NACK transmitted from the LTE network within the first remainder of the frame.

6. The user equipment of claim 2, wherein the processor is further configured to control the operation of the transceiver by:
maintaining an activation of the receiver when the ACK is received.

7. The user equipment of claim 6, wherein the processor is further configured to control the operation of the transceiver by:
determining the BLER for a predetermined number of prior frames relative to the frame;
comparing the BLER to a predetermined BLER threshold value; and
re-transmitting the data when the BLER is greater than the predetermined BLER threshold value and the NACK is received subsequent to the ACK being received.

8. The user equipment of claim 1, wherein the processor is further configured to control the operation of the transceiver by:
receiving the NACK at the predetermined third subframe; and re-transmitting the data at a predetermined fourth subframe subsequent to the third subframe.

9. The user equipment of claim 8, wherein the processor is further configured to control the operation of the transceiver by:
receiving the ACK at a predetermined fifth subframe subsequent to the third subframe, the remainder of the frame being subsequent to the fifth subframe.

10. A method, comprising:
at a user equipment configured to control an operation of a transceiver including a transmitter and a receiver, the transceiver configured to enable the user equipment to establish a connection with a Long Term Evolution (LTE) network, the user equipment and the LTE network configured with and utilizing a Connected Discontinuous Reception (CDRX) functionality:
receiving an uplink grant from the LTE network at a first subframe of a frame of a cycle of the CDRX functionality;
transmitting data based upon the uplink grant at a predetermined second subframe subsequent to the first subframe in the frame;
receiving a response from the LTE network corresponding to one of an acknowledgement (ACK) and a negative ACK (NACK) at a predetermined third subframe subsequent to the second subframe in the frame; and
deactivating the transmitter for a remainder of the frame based upon an error value associated with the user equipment during a duration while connected to the LTE network prior to when the ACK is received.

11. A user equipment, comprising:
a transceiver including a transmitter and a receiver, the transceiver configured to enable the user equipment to establish a connection with a Long Term Evolution (LTE) network, the user equipment and the LTE network configured with and utilizing a Connected Discontinuous Reception (CDRX) functionality; and
a processor configured to control an operation of the transceiver by:
receiving an uplink grant from the LTE network at a first subframe of a frame of a cycle of the CDRX functionality;
transmitting data based upon the uplink grant at a predetermined second subframe subsequent to the first subframe in the frame;
receiving a response from the LTE network corresponding to one of an acknowledgement (ACK) and a negative ACK (NACK) at a predetermined third subframe subsequent to the second subframe in the frame; and
deactivating the receiver for a remainder of the frame when the ACK is received in response to transmitting the data.

12. The user equipment of claim 11, wherein the processor and transceiver are configured to perform a Voice over LTE (VoLTE) call.

13. The user equipment of claim 11, wherein the data is a channel quality indicator (CQI) report.

14. The user equipment of claim 13, wherein the processor and transceiver are configured to periodically transmit the CQI report during a VoLTE call.

15. The user equipment of claim 13, wherein the processor is further configured to control the operation of the transceiver by:
receiving the ACK at the third subframe, the remainder of the frame being subsequent to the third subframe.

16. The user equipment of claim 15, wherein the remainder of the frame is subsequent to the fourth subframe.

17. The user equipment of claim 13, wherein the processor is further configured to control the operation of the transceiver by:
receiving the NACK at the third subframe; and
maintaining an activation of the receiver to receive a further response from the LTE network at a predetermined fourth subframe subsequent to the third subframe in the frame, the further response being an ACK.

18. The user equipment of claim 13, wherein the processor is further configured to control the operation of the transceiver by:
deactivating the transmitter after transmitting the CQI report.

19. The user equipment of claim 13, wherein the CQI report is transmitted only during a non-OnDuration and inactive timer period of the CDRX cycle.

20. A method, comprising:
at a user equipment configured to control an operation of a transceiver including a transmitter and a receiver, the transceiver configured to enable the user equipment to establish a connection with a Long Term Evolution (LTE) network, the user equipment and the LTE network configured with and utilizing a Connected Discontinuous Reception (CDRX) functionality, the user equipment configured to perform a Voice over LTE (VoLTE) call:
receiving an uplink grant from the LTE network at a first subframe of a frame of a cycle of the CDRX functionality;
transmitting data based upon the uplink grant at a predetermined second subframe subsequent to the first subframe in the frame;
receiving a response from the LTE network corresponding to one of an acknowledgement (ACK) and a negative ACK (NACK) at a predetermined third subframe subsequent to the second subframe in the frame; and
deactivating the receiver for a remainder of the frame when the ACK is received in response to transmitting the data.

* * * * *